June 7, 1938. J. E. PLUMSTEAD Re. 20,752

METHOD OF PRODUCING PUFFED PULP

Original Filed May 9, 1929 2 Sheets-Sheet 1

FLOW SHEET OF PULP MILL OPERATION

PULP PUFFING OPERATION

Inventor:

Joseph E. Plumstead,

By Spear, Davidson & Hall

Attorneys.

June 7, 1938. J. E. PLUMSTEAD Re. 20,752

METHOD OF PRODUCING PUFFED PULP

Original Filed May 9, 1929 2 Sheets-Sheet 2

FLOW SHEET OF PULP MILL OPERATION WITH PUFFED PULP OR PURIFIED CELLULOSE MANUFACTURE DOVE-TAILED INTO SCHEME.

Inventor:

Joseph E. Plumstead,

By Spear, Donaldson & Hall

Attorneys.

Reissued June 7, 1938

Re. 20,752

UNITED STATES PATENT OFFICE 20,752

METHOD OF PRODUCING PUFFED PULP

Joseph E. Plumstead, Wilmington, Del., assignor, by mesne assignments, to The Jessup & Moore Paper Co., Philadelphia, Pa., a corporation of Maryland Original No. 1,830,131, dated November 3, 1931, Serial No. 361,708, May 9, 1929. Application for reissue March 23, 1933, Serial No. 662,365

26 Claims. (Cl. 92—13)

This invention relates to the production of puffed pulp, particularly adapted for use in the manufacture of sheet material on a paper making machine.

One of the objects of the invention is the production in an economical way of puffed pulp, which will exhibit a maximum percentage of curled fibers and contain a minimum amount of deleterious material.

Another object of the invention is to so combine the soda process of producing pulp and recovering the valuable portions of the liquor drained and washed from the pulp, with my pulp puffing method, as to effect a particularly economical operation.

The invention primarily involves subjecting the substantially dry pulp to impregnation by a strong caustic solution in a suitable impregnator, wherein the liquid content of the mass will be limited in amount so that the mass will be maintained in a non-fluid condition.

Further objects of the invention will appear, as the same is particularly described hereinafter.

The invention will be hereinafter described in connection with the accompanying drawings, in which—

Figure 1:
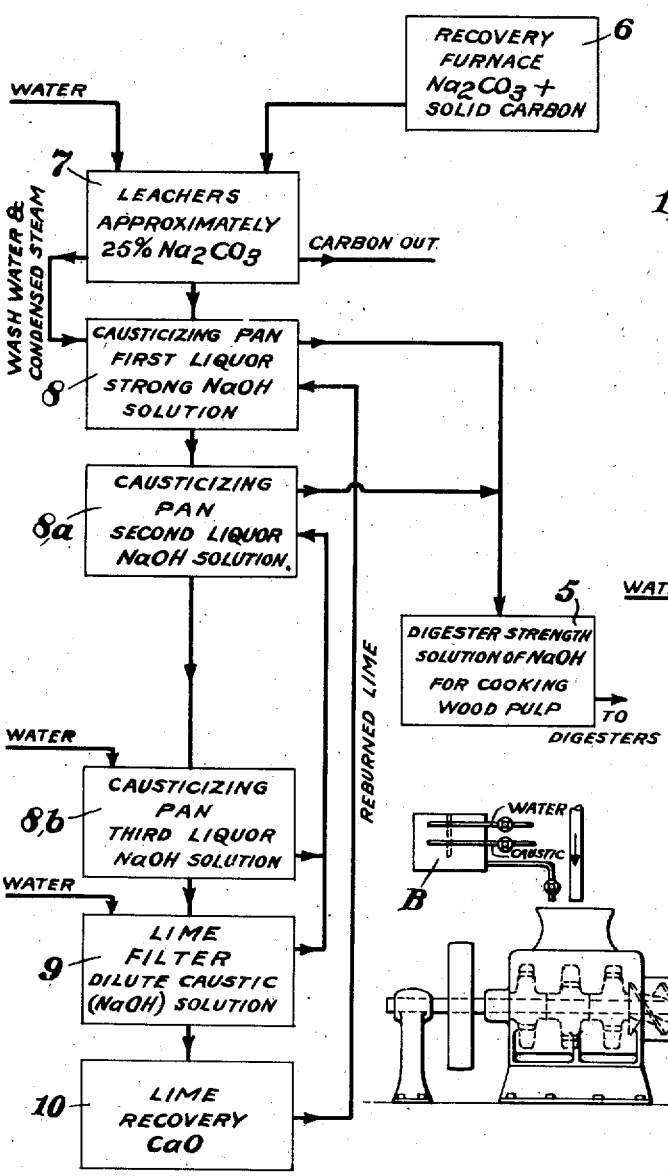
Fig. 1 shows diagrammatically a soda process.

Referring to Fig. 1, 5 designates a tank for receiving the caustic soda liquor of the desired concentration, or strength, for use in the cooking operation which is carried on in a digester, not shown.

The residue of colored liquor drained and washed from the cooked pulp is treated in a furnace designated 6 and the black ash formed is then treated in leachers designated 7. The resultant carbon is discharged from the system and the soda ash solution with the wash water and condensed steam is then discharged in a causticizing pan, designated 8, where it reacts with reburned lime to form a first caustic alkali of approximately the highest strength which will permit the desired reaction to proceed, say, for example, 16% sodium hydroxide (NaOH) concentration.

The clear solution is decanted and discharged after dilution, as will be hereinafter described, into the tank 5. The residue, as shown in Fig. 1, passes to a second causticizing pan 8a, into which is discharged the decanted sodium hydroxide from pan 8b and caustic soda filtrate from lime filter 9.

The decanted sodium hydroxide in pan 8a, which would be somewhat less than half the strength of that discharged from pan 8 (say, for example, approximately 7% concentration), is discharged into tank 5, and serves for diluting the sodium hydroxide discharged from tank 8, as previously described.

The residue from tank 8a is discharged into causticizing pan 8b, to which additional water is supplied. The sodium hydroxide decanted in this pan is discharged into pan 8a.

The residue from pan 8b is passed to a lime filter 9, which is supplied with a suitable quantity of water to recover the last traces of sodium hydroxide, which is passed to the pan 8a.

The residue from the lime filter is passed to a lime recovery plant and the reburned lime therefrom is supplied to the first causticizing pan 8.

As will be observed, the solution of sodium hydroxide which is used for the cooking operation carried on in the digester consists of the liquor from the causticizing pan 8, of approximately 16% concentration, and the liquor from the causticizing pan 8a, having approximately 7% concentration, so that the solution used in the digester has approximately a 10% concentration.

The volume of clear caustic solution discharged from pan 8a is in volume somewhat greater than that discharged from pan 8, due to the denser settling of the carbonate sludge in the weaker caustic solution.

It will be understood that the procedure so far described constitutes no part of my invention.

Figure 2:
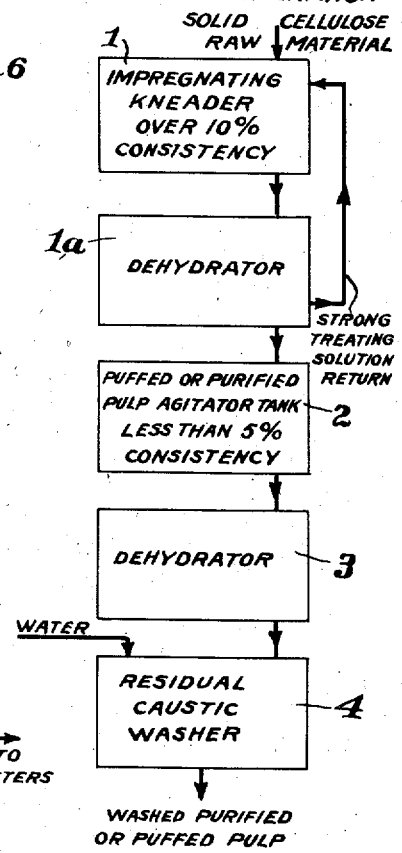
Fig. 2 shows diagrammatically one exemplification of my pulp puffing procedure.

One exemplification of that part of my invention relating to puffing pulp by impregnating the same with a strong caustic solution is shown diagrammatically in Fig. 2, to which reference is now made.

In practicing this exemplification of my invention, substantially dry fibrous cellulose pulp, or raw material is delivered to an impregnating kneader 1 to which is also delivered caustic alkali solution of sufficient strength, say 7% to 24%, to cause a curling of the fibres of the pulp upon impregnation. The caustic alkali is added only in such quantities that a resultant substantially non-fluid mass will be produced, the mass containing at least 10% of fibrous material, the remainder of the mass being caustic soda or caustic alkali solution.

Figure 4:
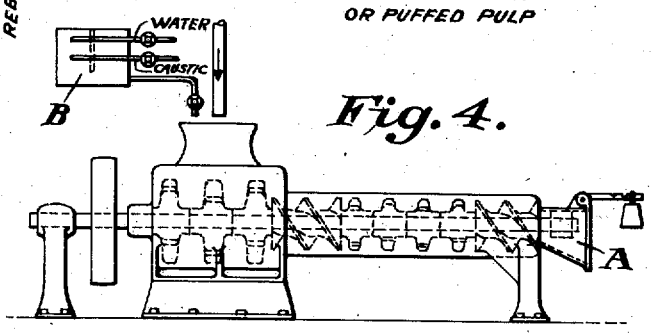
Fig. 4 shows conventionally a type of impregnator which can be used in the puffing operation, and means for supplying a caustic solution of regulated concentration to same.

The impregnating kneader may consist of a Lannoye pulper or any suitable kneader, such as shown in Fig. 4 in which the pressure producing means comprises the weighted valve A and the caustic strength varying means comprises separate valved conduits for water and caustic leading to a mixing chamber B which feeds the kneader, in case it is desired to vary the strength of the caustic fed to the kneader.

The purpose of the impregnation is to cause the curling of the fibre of the cellulosic pulp mass and a swelling, or puffing, of such mass so that a highly absorbent sheet of felt material may subsequently be produced from the puffed pulp by a paper making machine.

Exposure to or contact with air is entirely unnecessary in the puffing, or curling of the fibres of the cellulose mass. The puffing takes place upon contact of the individual fibres with the strong caustic solution, regardless of the presence or absence of air in contact with the fibre. This puffing is not demonstrated or apparent, however, until after thorough washing out of all caustic and dissolved substances, such as slimy hemi-cellulose or cementitious substances. In fact, it is probably better not to expose the fibre and solution to the air before washing. The caustic liquor may be said to have a "mercerizing" effect on the individual fibres which causes a swelling of the fibre casing and a skin tension unevenly distributed which causes the fibre to curl.

The treatment of the cellulosic fibrous material with caustic soda results also in a dissolving of the hemi-celluloses which are those carbohydrates which are insoluble in water but soluble in dilute acids and alkalis. The dissolving of the hemi-celluloses causes a consequent increase in the highly resistant alpha-cellulose percentage of the finished product, thus accomplishing cellulose purification.

It is desirable to entirely fill the pulper or kneader with the mass of pulp and caustic and to deliver the material thereto in such quantity that the mass of material and caustic alkali by reason of weighted outlet valve A (Fig. 4), will be under pressure which will aid in the quicker impregnation of the fibrous mass with the sodium hydroxide solution.

It is also desirable to provide for varying the strength of the sodium hydroxide solution by mixing means B (Fig. 4), to compensate for variations in the moisture content of the substantially dry cellulosic material being treated.

The pulp and caustic, after passing through the pulper or kneader, is then preferably passed to dehydrator 1a where the mass is wrung or pressed to remove some of the strong treating caustic solution therefrom and to reuse the recovered strong solution in the impregnation in the kneader.

The mass of puffed or purified pulp and caustic as shown in Fig. 2 is then preferably passed into an agitator tank 2 where more sodium hydroxide solution of weaker concentration is added causing the puffed pulp to become thoroughly impregnated and to be made fluid and of less consistency. The pulp and caustic is then transferred to a dehydrator 3 where it is dehydrated and the caustic solution is withdrawn, the pulp then being passed to a washer 4 in which residual caustic is removed by washing the purified or puffed pulp with water. The caustic solution withdrawn from dehydrator 3 may be returned to the impregnating kneader and reused in the manner described with respect to dehydrator 1a.

The washed puffed pulp is then ready for formation into sheets of highly absorbent felt by means of a suitable paper making machine, not shown.

Figure 3:
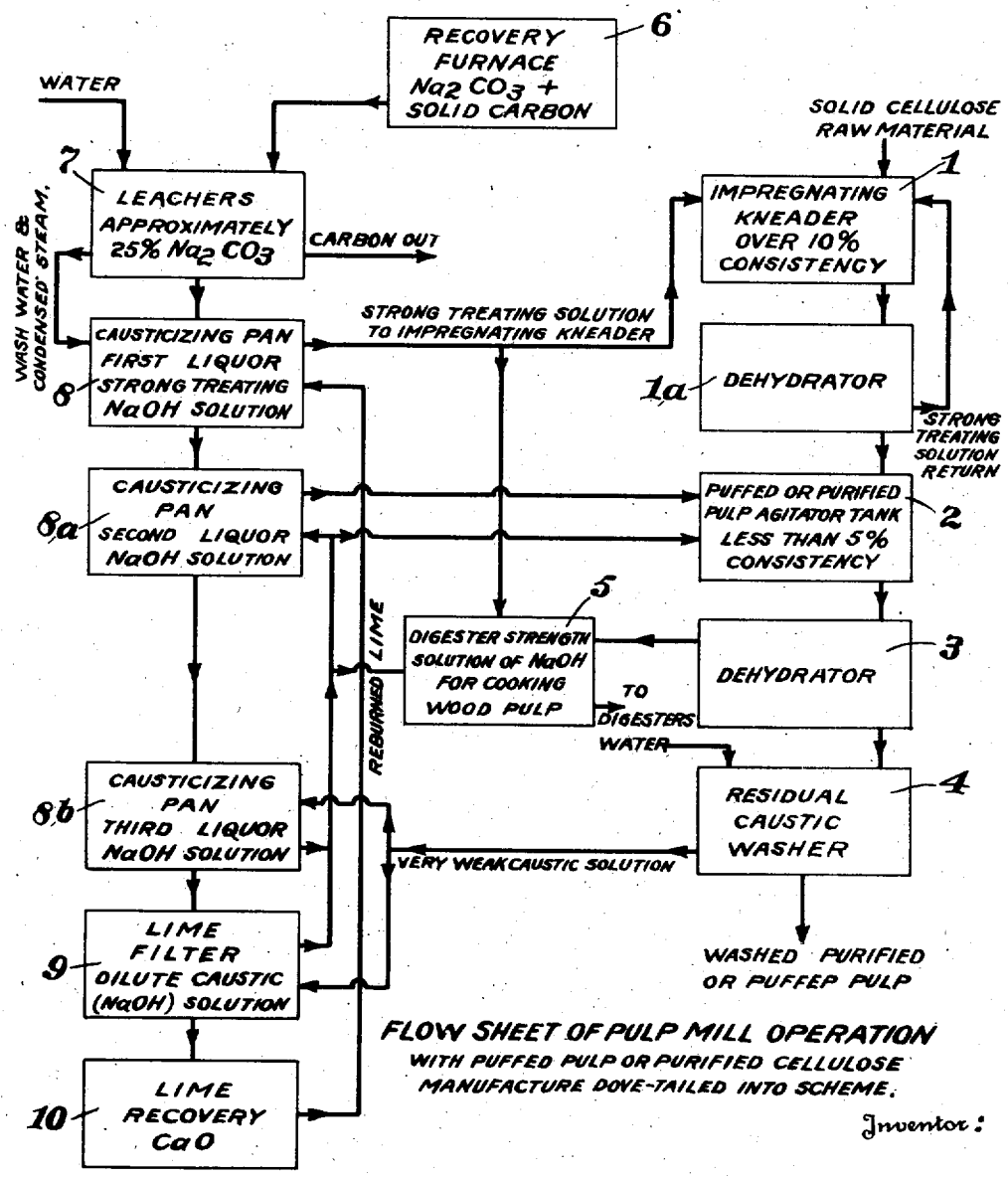
Fig. 3 shows diagrammatically one exemplification of a combination of the soda process with the puffing procedure.

Fig. 3 is a flow sheet showing a method of combining the process of puffing the pulp shown in Fig. 2, with the process of the preparation of the caustic alkali in the operation of a soda pulp mill as shown in Fig. 1. According to the process of Fig. 3, the caustic alkali used in the puffing operation is reused in the regular pulp cooking operation without any unusual dilution of the alkali solutions. It is important to the accomplishment of this advantageous use and distribution of caustic alkali without dilution, that substantially dry pulp be used at the start of the puffing operation. The pulp formed in the digesters is therefore substantially dehydrated after washing the black liquor therefrom, prior to starting the puffing operation.

Of course, other pulps may be used than that produced from caustic soda.

The combining of the puffing operation with the operation of the soda pulp mill is accomplished according to the present invention by pumping a portion of the strong (say about 16%), caustic liquor from causticizing pan 8 which may or may not be fortified by stronger caustic, to the Lannoye pulper or impregnating kneader 1, the other portion going to the digester strength solution tank 5 as before. The second liquor from pan 8a instead of passing directly to the digester solution receptacle 5 is passed directly to the agitator tank 2, and reaches the tank 5 indirectly after aiding in the puffing operation and passing through agitator tank 2 and dehydrator 3. The strong treating solution from the kneader also reaches the tank 5 after passing through dehydrator 1a, tank 2, and dehydrator 3.

A portion of the third liquor from pan 8b and the weak dilute solution from the lime filter returns to pan 8a as before, while a portion thereof passes to agitator tank 2 with the second solution from pan 8a, through the dehydrator to tank 5. A further portion of the weakest solutions (third liquor and lime filter solutions), is pumped directly to the tank 5.

A very weak caustic solution is obtained in the residual caustic washer 4 and this solution is conveyed in part to lime filter 9 and in part to pan 8b.

It will thus be seen that the present invention provides a novel pulp puffing process combined with a soda pulp mill caustic recovery and pulp cooking process so as to conserve without substantial dilution, the caustic liquors used in both the pulp cooking and puffing operations.

From the foregoing description of my invention, it will be understood that the cellulose material is cooked in the usual digesters into which is discharged the caustic liquor from the tank 5 and that the caustic is recovered in a lime caustic recovery system to a strength within a mercerizing activity range. This system includes the lime filter or sludge washer 9.

As stated, the cooked pulp is treated in the mixing apparatus 1, preferably a Lannoye pulper, with the recovered caustic, and the material therein has a pulp consistency not less than 10%—the mass containing 10% of pulp and the remainder being caustic soda and caustic alkali solutions.

Thereafter the caustic is washed out of the pulp in the dehydrator 3 and washer 4 by fresh water discharged into 4 and a weak caustic solution discharged into 2, supplied from the liquor contained in one, or more, of the pans 8a and 8b and lime filter 9. The liquor from the washer 4 is discharged into either, or both, of the pan 8b and lime filter 9.

It will be apparent that modifications may be made within the scope of the present invention and I do not desire to limit the invention to the exact steps shown in the flow sheets, nor to the strengths of solution which are stated merely by way of example.

The process of my invention is very rapid in its treatment of the pulp to puff the fibres and may require as low as one-half to three-quarters of a pound of alkali per pound of pulp material treated.

It will be understood that I do not confine my fibre treatment to fibres produced by any particular method but may use as a raw material fibres produced by the soda, sulphate, or sulphite processes, either cooked or uncooked cotton fibres, reed, grass, or straw cellulosic material, which may or may not have been previously bleached.

The continuous feature of the methods as referred to in the specification and claims is intended to broadly refer to substantial continuity, as it will be apparent that the process can be carried out more or less intermittently.

While it is specified that a substantially non-fluid mass is produced in the pulp puffing operation, it is not desired to restrict the invention to effecting dilution after the mass has been discharged from the pulper or kneader, since it will be apparent that the dilution of the non-fluid completely puffed mass could be readily effected in the pulper or kneader after the non-fluid mass is formed, without departing from the scope of the invention.

It is also not desired to limit the invention to any particular diluting liquid.

What I claim and desire to protect by Letters Patent is:

1. The method of utilizing the caustic alkali solution of a soda pulp mill in producing puffed pulp including the steps of supplying to an impregnating kneader for the pulp a portion of the strong caustic solution from the first causticizing pan, the other portion passing to the supply of caustic alkali solution for cooking the wood pulp, conveying the puffed pulp and caustic from the kneader to an agitating tank, conveying a second caustic liquor from a second causticizing pan to the agitator tank, conveying a portion of a third and fourth caustic liquor from a third causticizing pan and from a lime filter to said agitator tank, another portion of said third and fourth liquors passing to the second causticizing pan, conveying the puffed purified and agitated pulp and caustic to a dehydrator and conveying the caustic solution from said dehydrator to said pulp cooking supply.

2. A method according to claim 1 including the step of passing a still further portion of said third and fourth liquors directly to said pulp cooking supply.

3. A method according to claim 1 including the steps of washing the puffed pulp in a residual caustic washer and conveying the weak caustic thus obtained, in part to the third liquor and in part to the fourth liquor.

4. The continuous method of utilizing and economically conserving and reusing caustic alkali liquor for pulp cooking and for pulp puffing including the steps of delivering to a pulper a portion of the strong caustic liquor from the first causticizing pan, delivering the other portion to the supply of caustic for cooking the wood pulp, conveying the puffed pulp and caustic from the pulper to an agitating tank, conveying a second and weaker caustic liquor from a second causticizing pan to the agitator tank, conveying a portion of a third and fourth caustic liquor from a third causticizing pan and from a lime filter to said agitator tank, conveying another portion of said third and fourth caustic liquors to the second causticizing pan, conveying a still further portion of said third and fourth liquors directly to said pulp cooking supply, delivering the puffed and agitated pulp and caustic from the agitator to a dehydrator, conveying the caustic solution from said dehydrator to said pulp cooking supply, delivering the puffed pulp from said dehydrator to a residual caustic washer, washing the puffed pulp and conveying the weak caustic solution thus obtained, in part to the third liquor and in part to the fourth liquor.

5. The method of producing puffed pulp material comprising delivering substantially dry cellulosic fibrous pulp to an impregnating kneader, delivering caustic alkali to said impregnating kneader to produce in the kneader a puffing or curling of the fibres and to produce a substantially non-fluid mass, delivering said non-fluid mass to an agitator tank, delivering weaker caustic alkali to said agitator for further treatment of said mass, delivering said mass to a dehydrator, delivering the dehydrated mass to a residual caustic washer, and delivering the washed puffed fibrous pulp to a paper making machine and forming it into sheets of highly absorbent felt material.

6. The method of claim 5 in which the substantially dry cellulosic material is delivered to said kneader and maintained under pressure therein substantially out of contact with air, and in which the caustic alkali is supplied in such uniform quantity as to maintain the mass in the kneader over 10% consistency, and slightly varying the concentration of the uniform volume of the caustic alkali as to compensate for any variation in the moisture content of the substantially dry material supplied to the kneader.

7. The method of claim 5 in which the mass is partially dehydrated upon delivery from the impregnating kneader and prior to delivery to the agitator tank, the portion of strong caustic solution thus recovered being returned to the impregnator for reuse.

8. The method of claim 5 including the step of returning the caustic solution delivered from said dehydrator to said impregnating kneader for reuse.

9. The method of claim 5 including the additional steps of partially dehydrating the mass upon delivery from the impregnating kneader and prior to delivery to the agitator, returning the portion of strong caustic thus recovered to the impregnator for reuse, and also returning to the impregnator the caustic solution delivered from the dehydrator which follows the agitator.

10. The method of claim 5 in which the substantially dry cellulosic material is delivered to said kneader and maintained under pressure therein.

11. The method of claim 4 including the step of dehydrating the puffed pulp and caustic mass prior to its delivery to the agitating tank and returning the thus recovered portion of strong treating caustic solution to the pulper for reuse.

12. The hereindescribed method of producing puffed pulp including treating substantially dry cellulosic fibrous pulp material in a kneader with caustic alkali solution of sufficient strength such as will produce a puffing of the pulp or curling of the fibres and in such volume of solution as to produce a resultant substantially non-fluid mass containing at least 10% of fibrous material, said resultant non-fluid mass as treated being of such density that there can be no free drainage, and washing the material substantially free from caustic alkali and saponified substances.

13. The method of producing puffed pulp material according to claim 12 including dehydrat- the puffed fibrous non-fluid mass and forming it into sheets of highly absorbent fibrous felt material.

14. The method of cooking and puffing pulp comprising substantially continuously delivering caustic alkali liquor to digesters for cooking pulp and substantially continuously delivering a portion of the same supply of caustic alkali to an impregnating kneader, treating substantially dry cellulosic fibrous pulp in said impregnating kneader with said caustic alkali to produce a substantially non-fluid mass of puffed fibres, and delivering a substantial portion of the caustic alkali used in the puffing operation to the digesters for cooking pulp.

15. The method according to claim 14 including the steps of purifying the puffed fibrous pulp, and delivering the purified puffed fibrous pulp to a paper making machine and forming it into sheets of highly absorbent felt material.

16. The method of cooking and puffing pulp comprising substantially continuously delivering caustic alkali liquor to digesters for cooking pulp and substantially continuously delivering a portion of the same supply of caustic alkali to an impregnating kneader, treating cellulosic fibrous pulp in said impregnating kneader with said caustic alkali to produce a mass of puffed fibres, and delivering a substantial portion of the caustic alkali used in the puffing operation to the digesters for cooking pulp.

17. The method of cooking and puffing pulp comprising continuously or intermittently delivering caustic alkali liquor to digesters for cooking pulp and continuously or intermittently delivering a portion of the same supply of caustic alkali to an impregnating kneader in which is being treated a fibrous cellulosic material in a substantially non-fluid condition to which the caustic alkali has been added when said cellulosic material is in a substantially dry state, and returning a substantial portion of the caustic alkali used in the puffing operation for subsequent pulp cooking operations in the digesters.

18. The method of producing puffed pulp material according to claim 12 including diluting the puffed fibrous non-fluid mass, and subsequently dehydrating the diluted mass.

19. A step in the method of producing puffed pulp consisting in impregnating the substantially dry pulp with a caustic alkali solution of approximately 16% concentration in an impregnator, and maintaining the liquid content of the mass in such limited amount that it will not exceed that required for producing a non-fluid mass.

20. A step in the method of producing puffed pulp by curling the fibers thereof, this step consisting in impregnating the substantially dry pulp with a caustic alkali solution, and maintaining the fluid content of the mass of pulp and solution in such limited amount that it will not exceed that required for producing a non-fluid mass.

21. A process for producing puffed pulp which comprises making paper pulp by cooking wood chips in a pulp digester with caustic soda, and washing the pulp, passing a mixture of the pulp thus produced with caustic soda solution of mercerizing activity at a pulp consistency over 10% through a mixing apparatus, separating the caustic from the pulp, and returning the separated caustic to the pulp digester.

22. A process for producing puffed pulp which comprises cooking cellulose material with caustic soda for the manufacture of paper pulp, recovering the caustic with a lime caustic recovery system to a strength within the range of mercerizing activity, treating paper pulp in a mixing apparatus with the recovered caustic at a pulp consistency above 10%, and washing out the caustic.

23. A process for producing puffed pulp which comprises passing a mixture of paper pulp with caustic soda solution of mercerizing activity while maintaining a non-fluid pulp consistency over 10% through an impregnator, then subjecting the pulp to dehydration, thereafter treating it in an agitator tank with a caustic solution, then again subjecting the material to dehydration, and thereafter treating the material in a residual caustic washer.

24. A process for producing puffed pulp which comprises passing a mixture of cellulosic fibrous pulp and caustic alkali solution of mercerizing activity through a mixing apparatus while maintaining a non-fluid mass therein, and washing out the caustic alkali.

25. The method of producing puffed pulp including passing cellulosic fibrous pulp material and caustic alkali solution of sufficient strength to produce a puffing of the pulp or curling of the fibres through a kneader, the pulp material and caustic alkali solution being supplied in such proportion throughout the treatment that the material passing through the kneader is a non-fluid mass containing at least 10% of fibrous material, and washing out the caustic alkali.

26. A step in the method of producing puffed pulp by curling the fibres thereof, this step consisting in impregnating the pulp with a caustic alkali solution of mercerizing strength, and maintaining the fluid content of the mass of pulp and solution such as to maintain a non-fluid mass during the treatment.

JOSEPH E. PLUMSTEAD.